Patented Dec. 5, 1950

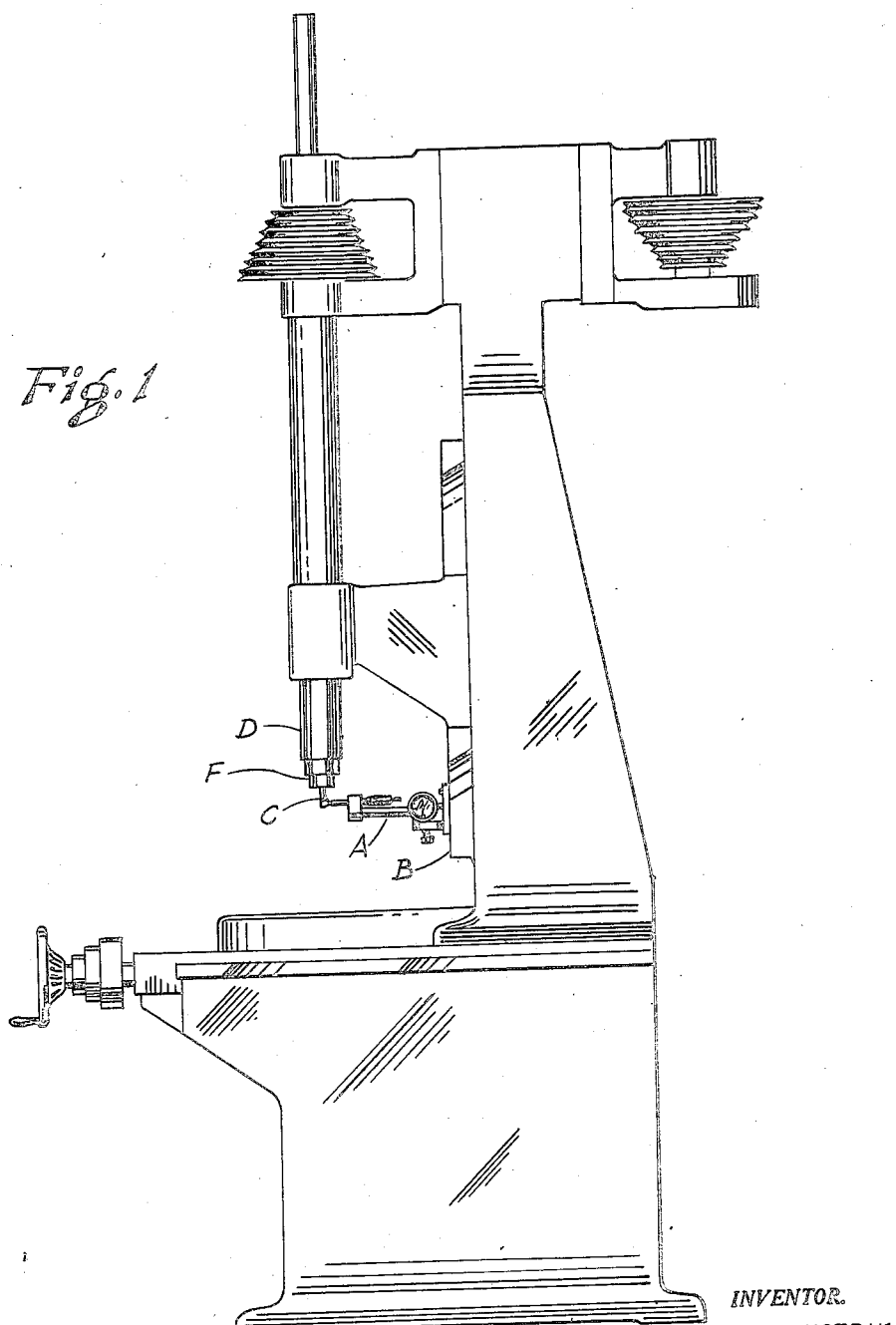

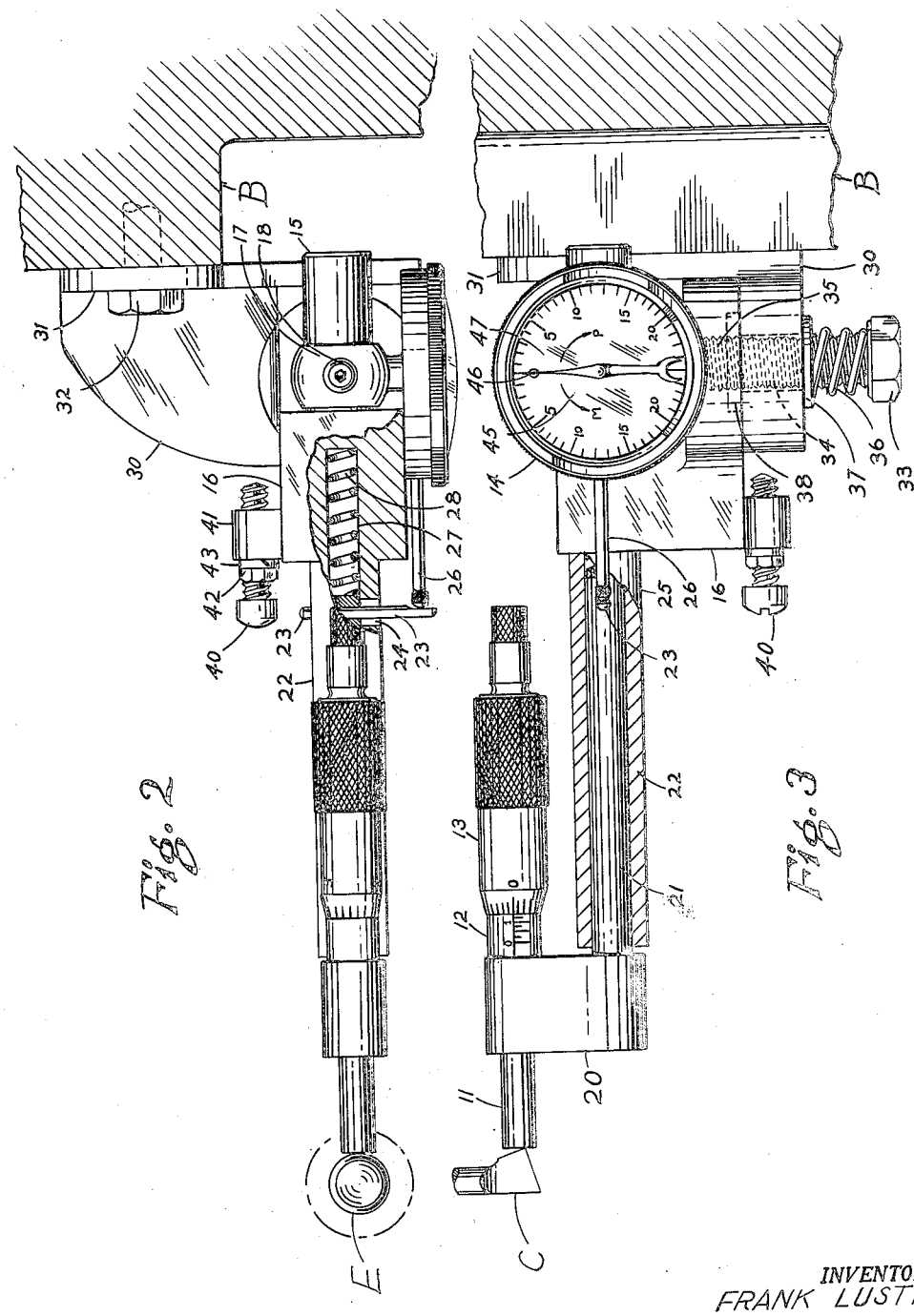

2,533,024

UNITED STATES PATENT OFFICE 2,533,024

GAUGING INSTRUMENT FOR SETTING CUTTING TOOLS

Frank Lustrik, Cleveland, Ohio

Application April 18, 1946, Serial No. 663,170

2 Claims. (Cl. 33—185)

This invention relates to a gaging instrument particularly adapted for setting cutting tools in metal-working machines.

It is common practice to set a cutting tool in a lathe, boring machine, or the like, by making trial cuts, calipering or gaging the work, and further adjusting the tool by a trial-and-error process until a sufficiently accurate setting is obtained.

This method is time-consuming and unsatisfactory; as a result, effort has been directed toward the development of gages to facilitate setting of the tool, such, for example, as those disclosed in United States Patents Numbers 1,243,545 and 2,348,530.

This invention is directed to an improved gage, which is accurate, easy to use, may be permanently mounted on a machine tool, and is adapted to maintain its precise relation to the spindle axis when swung out of the way to facilitate the machining operation.

An object of the invention is to produce a micrometrically accurate gage for tool setting.

Another object is to provide a gage which may be semi-permanently mounted on a machine tool.

Another object is to provide a gage which may be swung out of the way of machining operations without disturbing its calibration.

Another object of the invention is to provide a gage which is direct-reading and with which a tool may be rapidly set.

A further object is to provide a gage which employs a conventional micrometer and a conventional indicator gage, the remaining parts of the gage being of simple form adopted to economical precise fabrication.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is an elevation view of the gage mounted on a jig borer;

Fig. 2 is a plan view of the gage; and

Fig. 3 is an elevation of the gage.

In Fig. 1, the gage A is mounted on a portion of the frame B of a jig borer, in position to measure the setting of a boring tool C in the spindle D. In the enlarged view of Fig. 3, the tool C is shown engaging the spindle 11 of a conventional micrometer having a sleeve 12 and a thimble 13. The micrometer sleeve is mounted so as to have a limited axial movement, which movement is exhibited by the indicator 14, also of conventional type. The micrometer permits setting the gage for the desired cutting radius of the tool, and the indicator shows the departure of the tool from the correct setting, facilitating rapid and precise adjustment.

The indicator 14 is mounted on a boss 15 projecting from the gage frame 16, by means of a bracket 17 preferably formed for longitudinal and radial adjustment relative to the major axis of the frame and secured thereto by a set screw 18.

The micrometer is fitted in a bracket 20 in the manner customarily employed in mounting the micrometer head in the frame of a conventional micrometer caliper. The bracket 20 is provided with a push rod 21 mounted for sliding movement within a sleeve 22 formed integrally with the frame 16. The rod 21 is cross drilled for the reception of a pin 23 having the free ends thereof disposed within opposed slots 24 in the sleeve 22, to restrain the rod 21 against rotation, and permit limited axial movement of the rod and micrometer. A flat area 25 milled on the side wall of the depending end portion of the pin provides a bearing for the plunger 26 of the indicator 14.

A cavity 27 in the frame 16, constituting an extension of the bore in the sleeve 22, receives a spring 28 which urges the rod 21 outwardly. Normally, therefore, the pin 23 bears against the outer end walls of the slots 24.

The gage is semi-permanently mounted on the stanchion or frame B of the machine tool by means of a base plate 30, having a vertical flange 31 thereon, through which cap screws 32 may be inserted into holes drilled and tapped in the machine tool. Obviously, details of the mounting means may be varied to adapt the gage for installation on a machine of any desired type.

The frame 16 is mounted on the plate 30 for rotation in a horizontal plane about a cap screw 33 passing through a clearance hole 34 in the plate, and threaded in a tapped hole 35 in the frame. A spring 36 compressed between the head of the cap screw and a washer 37 provides sufficient frictional resistance between the frame and the plate to stabilize the support thereof after rotational adjustment of the gage.

The base is formed with a machined boss 38 snugly engaged within a counterbore in the lower surface of the frame 16 to prevent relative movement between the two members. A machine screw 40 (Fig. 2) threaded through a boss 41 of the frame 16 is adapted to engage the edge of the plate 30 and limit clockwise rotation of the gage; a jamb nut 42 and lock washer 43 are provided to retain the screw in adjusted position.

The gaging device is constructed so that the anvil of the micrometer will extend slightly beyond the medial axis of the spindle of the machine tool with which it is to be used when the micrometer is set to zero.

In the initial setting of the gage, an arbor E (Fig. 2), ground with precision to a given diameter, is mounted centrally in the spindle D (Fig. 1) of the jig boring machine. The micrometer is then set to the radius of the arbor, and the gage swung into position with the spindle 11 engaged with the arbor E.

During this operation, the rod 21 will be forced inwardly into the shell 22, compressing the spring 27, and causing the pin 23 to move the hand 45 of the indicator. The position assumed by the hand is immaterial, since the face 46 of the indicator may be rotated to align the zero marking on its dial 47 with the hand 45.

Upon completion of the adjustment, the micrometer may then be set to the desired radius of the hole to be bored, the arbor E removed, boring tool C (Fig. 3) mounted in the holder F, and the tool adjusted until the indicator is brought to zero.

The gage may then be swung out of the way, and the boring operation performed. It is obviously unnecessary to reset the indicator each time the gage is used, although it may be checked from time to time.

When the setting of the gage is checked, the concentricity of the arbor E with the spindle axis may be tested by rotating the spindle and observing the movement of the hand 45.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A gage for setting a cutting tool in a boring machine comprising a base adapted to be supported on the frame of a boring machine, a sleeve having a transaxial slot therein on said base, a rod mounted for reciprocative movement in said sleeve, a spring in said sleeve urging said rod outwardly, a pin in said rod protruding through the slot in said sleeve, a dial indicator mounted on said base, the plunger thereof being engaged with the protruding portion of said pin, a bracket on the free end of said rod and a micrometer screw and barrel assembly mounted in said bracket with the free end of the screw adapted to be disposed in proximity with the medial axes of the machine tool spindle whereby a micrometer screw may be set to a predetermined position relative to the axes of the spindle, the dial indicator adjusted to identify such setting, the micrometer readjusted to the radius of the desired cut, and the cutting tool adjusted in reference to the micrometer screw and dial indicator.

2. A gage for setting a boring bar cutter or the like of a machine tool comprising a base adapted for mounting on a frame portion of a machine tool, a first member extending from said base, a second member mounted on said first member for free axial reciprocation relative thereto, a calibrated micrometer screw barrel fixed on the end of said second member, a calibrated micrometer screw threaded in said barrel, said screw having a contact spindle that extends axially past the outermost extremity of said second member in the axis of said screw, a spring-biased dial-type indicator mounted on said first member having a contact piece, abutment means on said second member for engaging the contact piece of said indicator, and a main spring connected to said members and being of sufficient strength to cause relative extension of said members, said main spring being substantially stronger than the bias spring in the indicator, and means to limit the relative extension of said members under the force of said main spring.

FRANK LUSTRIK.

REFERENCES CITED

The following references are of record in the file of this patent:

UNITED STATES PATENTS

| Number | Name | Date |
| --- | --- | --- |
| 300,533 | Thompson | June 17, 1884 |
| 1,394,324 | Matthews | Oct. 18, 1921 |
| 1,579,291 | Emery | Apr. 6, 1926 |
| 1,960,751 | Morrison | May 29, 1934 |
| 2,107,558 | Zimmerman | Feb. 8, 1938 |
| 2,213,088 | Hahn | Aug. 27, 1940 |
| 2,329,382 | Blazek et al. | Sept. 14, 1943 |
| 2,343,309 | Lloyd | Mar. 7, 1944 |
| 2,348,530 | Droitcour et al. | May 9, 1944 |
| 2,468,307 | Overholt | Apr. 26, 1949 |

FOREIGN PATENTS

| Number | Country | Date |
| --- | --- | --- |
| 344,334 | Germany | Nov. 19, 1921 |
| 649,271 | Germany | Aug. 19, 1937 |